(12) United States Patent
Eiraku et al.

(10) Patent No.: US 7,748,216 B2
(45) Date of Patent: Jul. 6, 2010

(54) INTERNAL COMBUSTION ENGINE

(75) Inventors: Akira Eiraku, Susono (JP); Naoki Kokubo, Nukata-gun (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 266 days.

(21) Appl. No.: 11/790,877

(22) Filed: Apr. 27, 2007

(65) Prior Publication Data
US 2008/0163623 A1 Jul. 10, 2008

(30) Foreign Application Priority Data
May 11, 2006 (JP) ............... 2006-133054

(51) Int. Cl.
F02D 23/00 (2006.01)
F02D 35/00 (2006.01)
F01N 5/04 (2006.01)
F02B 37/12 (2006.01)
F02B 37/10 (2006.01)
G01N 27/419 (2006.01)
G01N 27/26 (2006.01)
G01N 27/407 (2006.01)

(52) U.S. Cl. ............... 60/602; 60/280; 204/428; 204/429

(58) Field of Classification Search ............... 60/602, 60/280; 204/428–429; 415/203–205; 417/406–409; F02B 37/12
See application file for complete search history.

(56) References Cited

U.S. PATENT DOCUMENTS 3,844,920 A * 10/1974 Burgett et al. ............ 204/428
4,096,050 A * 6/1978 Kobayashi et al. ....... 204/428
4,169,778 A * 10/1979 Mann et al. ............... 204/429
4,175,019 A * 11/1979 Murphy .................... 204/429
4,559,776 A * 12/1985 Arai et al. ................. 60/280
5,584,181 A * 12/1996 Jinnouchi ................. 60/602
7,198,459 B2 * 4/2007 Grussmann et al. ...... 415/135
2007/0240694 A1 10/2007 Zhang ...................... 60/602

FOREIGN PATENT DOCUMENTS

DE  101 53 735 A1  5/2003
DE  10 2004 026 176 B3  8/2005

(Continued)

OTHER PUBLICATIONS

A certified English Translation of JP 61-162539 U.*

(Continued)

*Primary Examiner*—Thai Ba Trieu
(74) *Attorney, Agent, or Firm*—Oliff & Berridge, PLC

(57) ABSTRACT

A turbine of a turbocharger is disposed on an exhaust passage. An air-fuel ratio sensor is disposed downstream of and in proximity to the turbine. An element of the air-fuel ratio sensor is positioned on or near the axis of an exhaust port of the turbine. A whirling flow of an exhaust gas in the same direction as a turbine wheel rotates is produced immediately after the exhaust port of the turbine, so that the whirling flow of the exhaust gas can centrifuge condensed water in the exhaust gas. The exhaust gas contacts the element near the axis of the exhaust port where there is substantially no condensed water, thus preventing the element from being wetted with water or cracked.

8 Claims, 7 Drawing Sheets

FOREIGN PATENT DOCUMENTS

| | | | |
|---|---:|---|---|
| EP | 34765 A1 | * | 9/1981 |
| FR | 2 483 515 | | 12/1981 |
| GB | 2059 515 A | * | 4/1981 |
| JP | 54019007 A | * | 2/1979 |
| JP | A-56-009632 | | 1/1981 |
| JP | 58028559 A | * | 2/1983 |
| JP | 58085321 A | * | 5/1983 |
| JP | 60022024 A | * | 2/1985 |
| JP | 61096138 A | * | 5/1986 |
| JP | U-61-162539 | | 10/1986 |
| JP | A-01-096438 | | 4/1989 |
| JP | A-05-187329 | | 7/1993 |
| JP | A-08-144836 | | 6/1996 |
| JP | A-09-184443 | | 7/1997 |
| JP | A-09-222416 | | 8/1997 |
| JP | 10159554 A | * | 6/1998 |
| JP | A-2000-310116 | | 11/2000 |
| JP | A-2003-206793 | | 7/2003 |
| JP | 2004293403 A | * | 10/2004 |
| JP | 2004309345 A | * | 11/2004 |
| JP | A-2007-247560 | | 9/2007 |
| JP | 2008208787 A | * | 9/2008 |
| WO | WO 96/17158 | | 6/1996 |

OTHER PUBLICATIONS

French Search Report issued Feb. 24, 2010 with English-language translation for French Patent Application No. FR 0703358.

* cited by examiner

F I G . 3
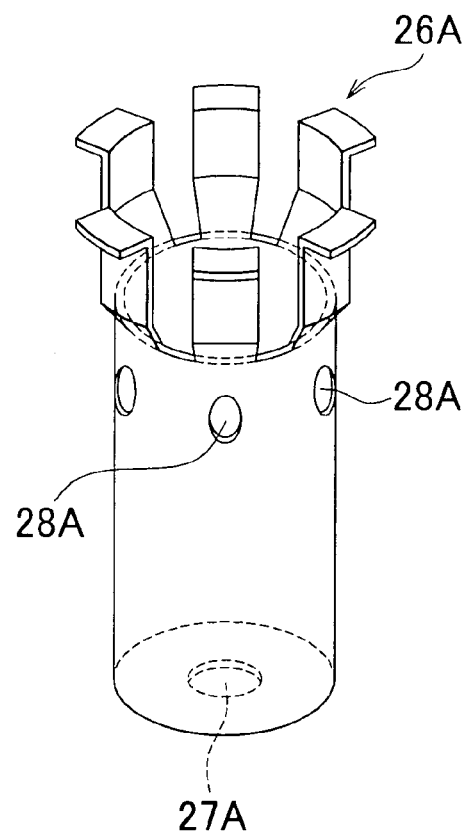
F I G . 4
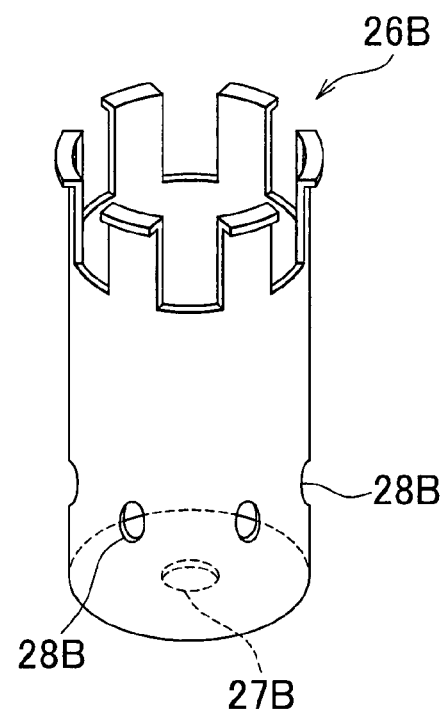

INTERNAL COMBUSTION ENGINE

INCORPORATION BY REFERENCE

The disclosure of Japanese Patent Application No. 2006-133054 filed on May 11, 2006 including the specification, drawings and abstract is incorporated herein by reference in its entirety.

BACKGROUND OF THE INVENTION

1. Field of the Invention

The present invention relates to an internal combustion engine, and more particularly to an internal combustion engine having an air-fuel ratio sensor disposed on an exhaust passage.

2. Description of the Related Art

In general internal combustion engines, the air-fuel ratio of an exhaust gas is feedback-controlled by detecting the air-fuel ratio with an air-fuel ratio sensor installed on an exhaust passage and making adjustments such that the detected air-fuel ratio coincides with a predetermined target air-fuel ratio. When the air-fuel ratio sensor (specifically a sensor element) is at low temperatures and hence not activated, for example immediately after starting up the internal combustion engine, the air-fuel ratio sensor cannot detect the air-fuel ratio. Thus, in order to activate the air-fuel ratio sensor more quickly, the air-fuel ratio sensor is provided with a heater for heating the air-fuel ratio sensor while the heater is energized. This allows the air-fuel ratio sensor to start detecting the air-fuel ratio quickly after the start up of the internal combustion engine, thus allowing the feedback control of the air-fuel ratio to start quickly, and emission (specifically cold emission) after engine startup to be reduced.

When the exhaust passage is cold, for example immediately after engine startup in a cold state, the exhaust gas is cooled and water vapor contained in the exhaust gas is condensed to produce condensed water. Under such conditions, if the condensed water adheres to the sensor element while being heated, the sensor element may be cracked by "thermal shock." Therefore, the sensor element cannot be heated even when it is desired to do so, causing unfavorable delay of the start of the feedback control of the air-fuel ratio and difficulties in improving emission immediately after engine startup.

Various proposals have been made so far to prevent condensed water from adhering to the sensor element of the air-fuel ratio sensor, and the sensor element from being cracked. For example, the air-fuel ratio sensor disclosed in JP-A-9-222416 has inner and outer covers for covering a sensor element. The covers are formed with openings for introducing an exhaust gas to the sensor element. The openings of the covers are not in alignment with each other in order to lengthen the exhaust gas flow passage through the openings, thus making it difficult for condensed water to reach the sensor element.

With the structure of the air-fuel ratio sensor disclosed in JP-A-9-222416, however, the exhaust gas also cannot easily reach the sensor element, which may delay the detection of the air-fuel ratio, and may worsen the air-fuel ratio detection response as well as the precision of the air-fuel ratio feedback control.

Meanwhile, turbochargers are known as means for increasing the output power of internal combustion engines. In an internal combustion engine provided with a turbocharger, a turbine disposed on an exhaust passage increases the heat capacity of the exhaust passage. Therefore, it takes a relatively long time to warm the exhaust passage, and condensed water is produced in an increased amount and/or for a longer time. With an air-fuel ratio sensor installed downstream of the turbine, it is more likely that the air-fuel ratio sensor will be wetted with condensed water, and that the sensor element will be cracked.

SUMMARY OF THE INVENTION

The present invention provides an internal combustion engine having a turbine of a turbocharger and an air-fuel ratio sensor disposed on an exhaust passage, which can prevent the air-fuel ratio sensor from being wetted with condensed water in the exhaust passage, and a sensor element from being cracked.

A first aspect of the present invention provides an internal combustion engine including: a turbocharger having a turbine disposed on an exhaust passage; and an air-fuel ratio sensor including an element for contacting an exhaust gas. The air-fuel ratio sensor is disposed downstream of and in proximity to the turbine with the element positioned on or near an axis of an exhaust port of the turbine.

When the exhaust gas is discharged from the exhaust port of the turbine during operation of the internal combustion engine, the exhaust gas whirls in the same direction as the turbine wheel rotates in an area immediately after the exhaust port. Condensed water contained in the exhaust gas is centrifuged and forced radially outward by the exhaust gas whirling flow. As a result, there is substantially no condensed water near the axis of the exhaust port. According to the first aspect of the present invention, the element of the air-fuel ratio sensor is positioned on or near the axis of the exhaust port. This allows the exhaust gas to contact the element in an area where there is substantially no condensed water, thus preventing the element from contacting condensed water and being cracked thereby.

A second aspect of the present invention provides an internal combustion engine including: a turbocharger having a turbine disposed on an exhaust passage; and an air-fuel ratio sensor including an element for contacting an exhaust gas and a cover for covering the element. The cover has a hole for inducting the exhaust gas in the exhaust passage to the element. The air-fuel ratio sensor is disposed downstream of and in proximity to the turbine with the hole positioned on or near an axis of an exhaust port of the turbine.

In the second aspect of the present invention, the hole of the cover of the air-fuel ratio sensor is positioned on or near the axis of the exhaust port of the turbine. This allows the exhaust gas to be inducted into the cover through the hole and to contact the element in an area where there is no condensed water. Thus, the element can be prevented from contacting condensed water and being cracked thereby.

The first or second aspect of the present invention may be provided with a bypass passage for allowing the exhaust gas to bypass a turbine wheel of the turbine. In this case, an outlet of the bypass passage may open into a part of the exhaust passage between the exhaust port and the air-fuel ratio sensor in a direction tangent to a circumference of the exhaust passage.

In this aspect, the outlet of the bypass passage opens into the exhaust passage in a direction tangent to the circumference of the exhaust passage. With this construction, when exhaust bypassing through the bypass passage is performed, the bypass flow can merge with the whirling flow in the same direction as each other. This does not disturb the whirling flow, thus allowing centrifugal separation of condensed water to be performed suitably.

A part of the exhaust passage between the exhaust port and the air-fuel ratio sensor may be formed with a recess depressed outward in a radial direction of the exhaust passage.

With this construction, condensed water centrifuged by the exhaust gas whirling flow can be retained in the recess, thus preventing the condensed water from flowing downstream of the recess. This can more reliably prevent the air-fuel ratio sensor from being wetted with water.

The recess may be a groove along a circumference of the exhaust passage. With this construction, condensed water can be retained in an elongated area along the circumference of the exhaust passage, thus more reliably preventing the condensed water from flowing downstream.

The groove may be a spiral groove extending from a predetermined position between the exhaust port and the air-fuel ratio sensor to a predetermined position downstream of the air-fuel ratio sensor. With this construction, condensed water centrifuged as described above can be retained in the spiral groove, caused to flow along the spiral groove, and discharged downstream of the air-fuel ratio sensor. This can more reliably prevent the air-fuel ratio sensor from being wetted with water.

A bent portion may be formed on a part of the exhaust passage downstream of the exhaust port, and the air-fuel ratio sensor may be disposed at the bent portion so as to be coaxial with the exhaust port.

The bent portion may be bent by an angle of 90°.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 is a perspective view showing an inner cover member of the air-fuel ratio sensor;

FIG. 4 is a perspective view showing an outer cover member of the air-fuel ratio sensor;

DETAILED DESCRIPTION OF THE PREFERRED EMBODIMENTS

A best mode for carrying out the present invention will be described hereinafter in detail with reference to the accompanying drawings.

Figure 1:
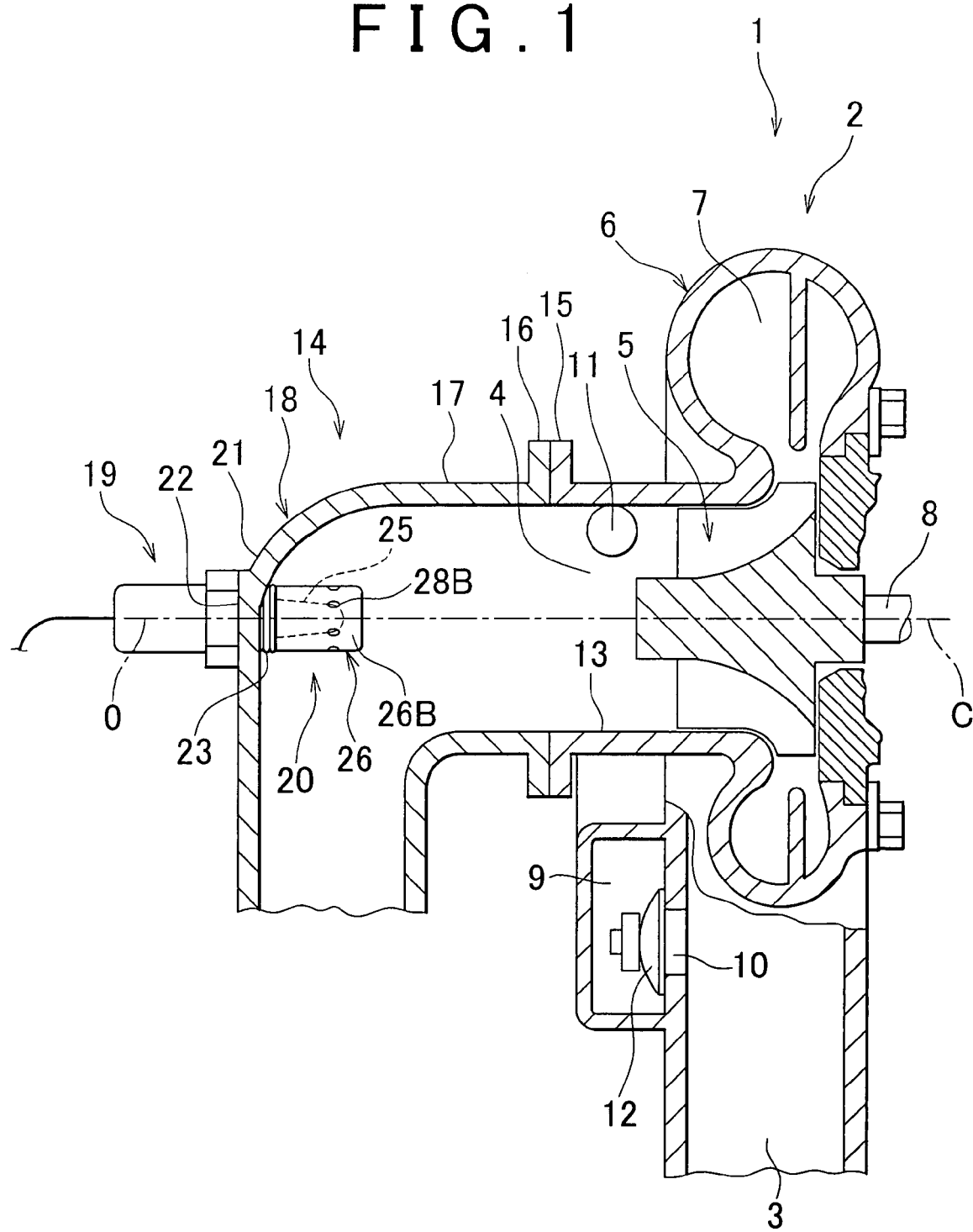
FIG. 1 is a vertical cross sectional view showing one embodiment of the present invention.

FIG. 1 is a vertical cross sectional view showing an essential part of an internal combustion engine, specifically the structure of an exhaust system thereof, according to an embodiment. As shown in the drawing, a turbine 2 of a turbocharger 1 is disposed on an exhaust passage of the internal combustion engine. The term "exhaust passage" as used herein refers to all the passages through which the exhaust gas of the internal combustion engine flows (except bypass passage to be described later). The turbine 2 is connected downstream of an exhaust manifold attached to an engine body (not shown). The exhaust gas provided from the exhaust manifold is inducted from an intake port 3, drives a turbine wheel 5 for rotation, and then is emitted from an exhaust port 4. The centrifugal turbine 2 includes a turbine housing 6 for accommodating the turbine wheel 5 so as to be rotatable. The turbine housing 6 defines not only the intake port 3 and the exhaust port 4, but also a scroll chamber 7 provided on the radially outer side of the turbine wheel 5 to entirely surround the turbine wheel 5. The exhaust gas inducted from the intake port 3 flows toward the radially inner side of the turbine wheel 5 while circulating in the scroll chamber 7 to drive the turbine wheel 5 for rotation. The rotation of the turbine wheel 5 is transmitted to a compressor wheel (not shown) coaxially coupled to the turbine wheel 5 via a turbine shaft 8, thus allowing a compressor to forcibly induct fresh-air into the internal combustion engine. The following direction of the exhaust gas is bent by 90° as the exhaust gas passes through the turbine wheel 5. After being used to drive the turbine wheel 5 for rotation, the exhaust gas is directed to an axial end of the turbine wheel 5 and discharged from the exhaust port 4. The turbine wheel 5, the turbine shaft 8 and the exhaust port 4 are arranged coaxially with the turbine axis C.

A bypass passage 9 for allowing the exhaust gas to bypass the turbine wheel 5 is provided for boost control. In this embodiment, the bypass passage 9 is provided in the turbine 2 and formed integrally with the turbine housing 6. An inlet 10 and an outlet 11 of the bypass passage 9 open into the intake port 3 and the exhaust port 4, respectively, thus allowing direct communication between the intake port 3 and the exhaust port 4. An waste gate valve 12 for opening and closing the inlet 10 is provided in the bypass passage 9. The waste gate valve 12 is opened and closed by an actuator (not shown) based on the intake pressure. More specifically, the waste gate valve 12 is opened when the intake pressure reaches a predetermined upper limit to prevent the boost pressure from rising excessively.

Specifically, the outlet 11 of the bypass passage 9 opens into the exhaust port 4 in a direction tangent to the circumference of the exhaust port 4, more specifically such that the bypass gas discharged from the outlet 11 flows along an inner wall 13 of the exhaust port 4. A part of the side surface of the bypass passage 9 is connected to the exhaust passage along a direction tangent to the circumference of the exhaust passage.

An exhaust pipe 14 is connected downstream of the turbine 2 through flanges 15 and 16. The exhaust pipe 14 is in direct communication with the exhaust port 4. The exhaust pipe 14 includes a straight portion 17 and a bent portion 18 provided in this order from its upstream side to its downstream side. The straight portion 17 extends from the connection with the exhaust port 4 for a short length. The bent portion 18 is bent at a position in proximity to the exhaust port 4 by an angle of 90°. The straight portion 17 is disposed coaxially with the exhaust port 4.

An air-fuel ratio sensor 19 for detecting the air-fuel ratio of the exhaust gas is attached to the bent portion 18 of the exhaust pipe 14. That is, the air-fuel ratio sensor 19 is disposed downstream of and in proximity to the turbine 2. The term "air-fuel ratio sensor" as used herein refers to a sensor that outputs a signal in accordance with the concentration of oxygen in the exhaust gas. The air-fuel ratio sensor includes a so-called $O_2$ sensor whose output sharply varies at a certain air-fuel ratio (for example, the theoretical air-fuel ratio, A/F=about 14.6), and a so-called A/F sensor that outputs linearly and continuously changing values over a wide air-fuel ratio range. The air-fuel ratio sensor 19 in this embodiment is an O₂ sensor, but may be an A/F sensor or other type of air-fuel ratio sensor.

The air-fuel ratio sensor 19 is axially elongated, and its axial end is provided with a gas-contacting part 20 disposed in the exhaust pipe 14 to contact the exhaust gas. The air-fuel ratio sensor 19 is attached at an outer corner portion 21 of the bent portion 18, more specifically seated on a pedestal 22 formed on the outer surface of the outer corner portion 21. The air-fuel ratio sensor 19 is provided with a male thread 23 to be threaded into a threaded hole formed in the pedestal 22. As shown in the drawing, the air-fuel ratio sensor 19 is attached coaxially with the turbine axis C, that is, coaxially with the exhaust port 4. The gas-contacting part 20 of the air-fuel ratio sensor 19 is directed to the exhaust port 4. The exhaust port 4 is opened in the gas-contacting part 20.

Figure 2:
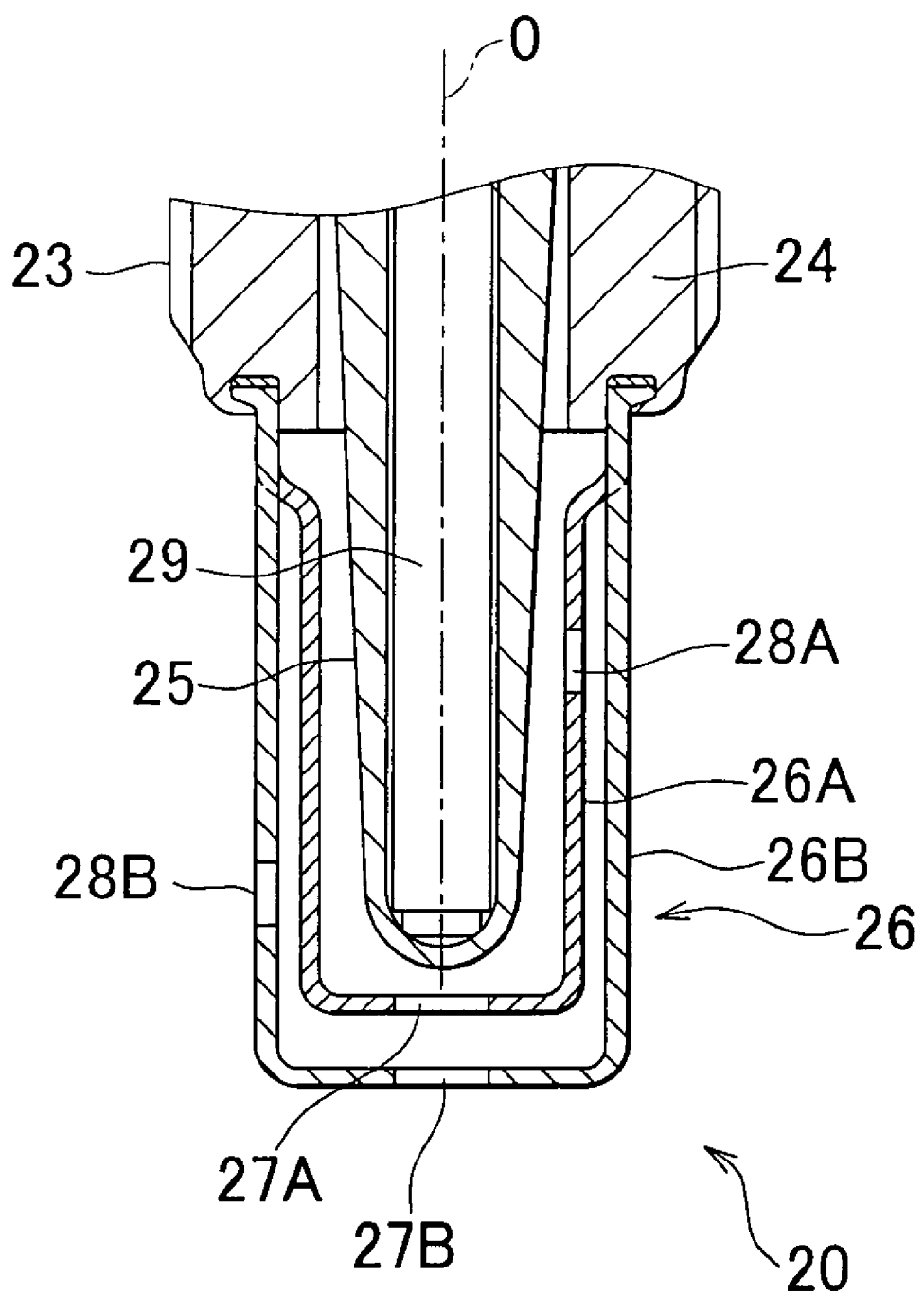
FIG. 2 is a vertical cross sectional view showing a gas-contacting portion of an air-fuel ratio sensor.

FIG. 2 shows the details of the gas-contacting part 20. The gas-contacting part 20 includes an element 25 supported by a sensor body 24 coaxially therewith and a cover 26 for covering the element 25 from outside. An end of the element 25 projects from the sensor body 24. The element 25 is an oxygen detection element made of a solid electrolyte. When contacting an exhaust gas, the element 25 outputs a signal in accordance with the concentration of oxygen in the exhaust gas. The element 25 has the shape of a tapered and elongated round tube, with its axial end rounded and closed. The cover 26 is made up of two cover members, namely an inner cover member 26A also shown in FIG. 3 and an outer cover member 26B also shown in FIG. 4. Each of the inner cover member 26A and the outer cover member 26B has the shape of a round tube with a constant diameter, with its end closed and its base engaged with the sensor body 24.

In order to induct the exhaust gas existing outside the cover 26 into the cover 26 to bring it into contact with the element 25, each of the inner cover member 26A and the outer cover member 26B is formed with a hole for allowing the exhaust gas to pass therethrough. The inner cover member 26A is formed with one inner end hole 27A in the center of its end surface and a plurality of inner side holes 28A in its peripheral surface on the base side. The outer cover member 26B is formed with one outer end hole 27B in the center of its end surface and a plurality of outer side holes 28B in its peripheral surface on the end side. The inner end hole 27A and the outer end hole 27B are arranged concentrically with the sensor axis O with the inner cover member 26A and the outer cover member 26B assembled to the sensor body 24. This facilitates immediate induction of the exhaust gas and intrusion of condensed water though. On the other hand, the inner side holes 28A and the outer side holes 28B are not in alignment axially or circumferentially, thus making it difficult for condensed water to enter though delaying induction of the exhaust gas.

In order to immediately activate the air-fuel ratio sensor 19, in particular the element 25, the air-fuel ratio sensor 19 is provided with an electric heater 29 for heating the element 25. The heater 29, of a round stick, is inserted into the element 25 of a round tube. When the heater 29 is energized by a control unit (not shown), the heater 29 rises its temperature to heat the element 25.

The air-fuel ratio sensor 19 is symmetric with respect to the sensor axis O. That is, the sensor body 24, the element 25, the inner cover member 26A, the outer cover member 26B and the heater 29 are all arranged coaxially with respect to the sensor axis O.

As shown in FIG. 1, the air-fuel ratio sensor 19 is attached with its sensor axis O on an extension of the turbine axis C. As a result, the element 25 of the air-fuel ratio sensor 19 is positioned on the axis of the exhaust port 4 of the turbine 2 (that is, on an extension of the turbine axis C).

Figure 5:
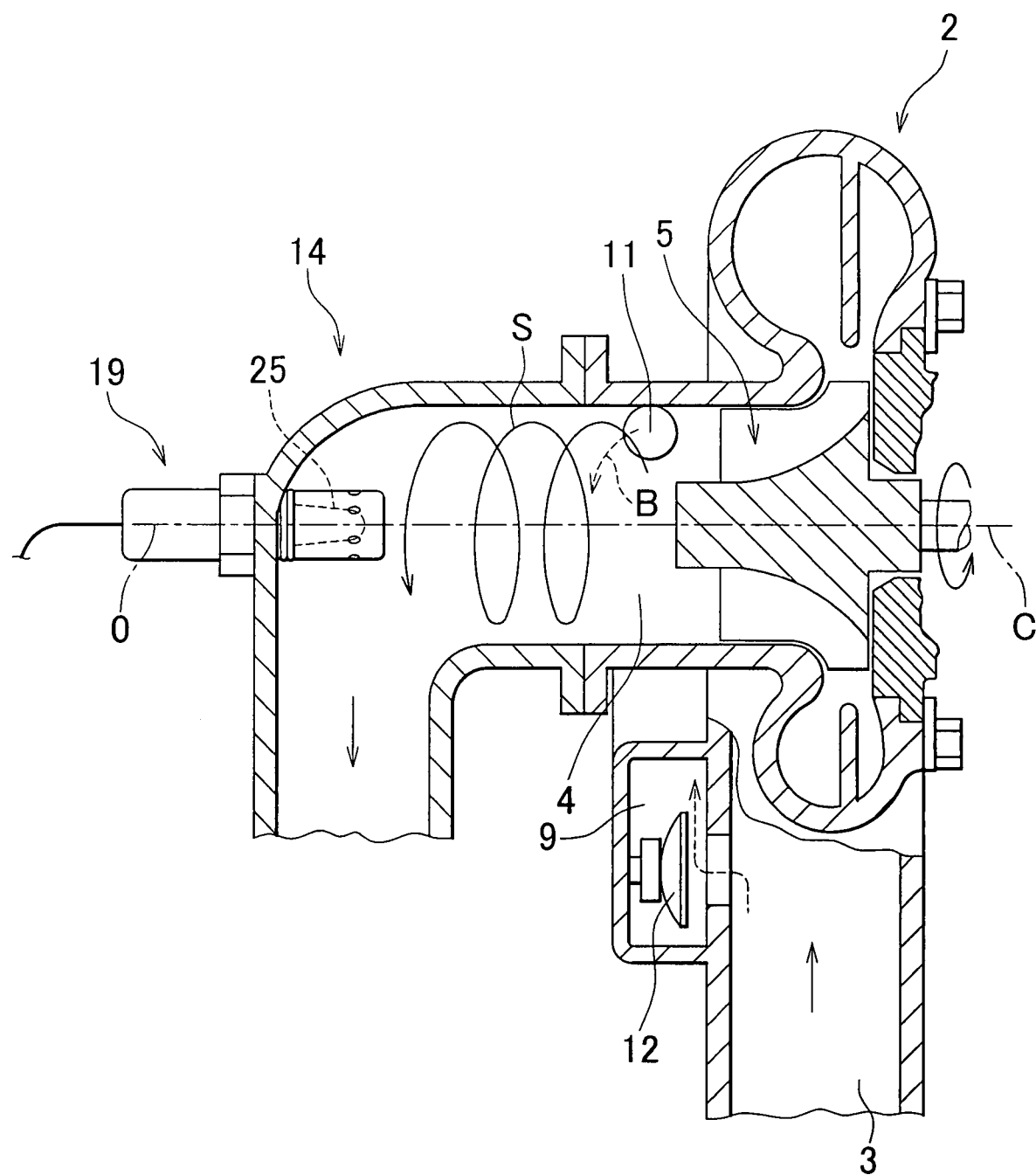
FIG. 5 is a vertical cross sectional view for explaining the functions and effects of this embodiment.

The functions and effects provided by this embodiment will be described below. When the internal combustion engine is operated, an exhaust gas flows into the intake port 3 of the turbine 2, drives the turbine wheel 5 for rotation, and is discharged from the exhaust port 4, as shown in FIG. 5. After passing through the turbine wheel 5, the exhaust gas flows downstream along the longitudinal direction of the exhaust passage. Particularly in an area immediately after the turbine wheel 5, the exhaust gas whirls in the same direction as the turbine wheel 5 rotates, as indicated by the arrow "S" in the drawing.

When the inside of the exhaust passage is cold, for example immediately after starting up the internal combustion engine in a cold state, there is condensed water, mixed in the exhaust gas in the exhaust passage, produced by condensation of water vapor contained in the exhaust gas. Particularly in the case with the turbine 2, which has a large heat capacity, a more amount of condensed water tends to be mixed in the exhaust gas for a longer time than without the turbine 2. Even under such conditions, however, the condensed water contained in the exhaust gas is centrifuged and forced radially outward against the inner wall of the exhaust passage by the exhaust gas whirling flow S described above, to flow downstream along the inner wall of the exhaust passage. In this way, the condensed water can be centrifuged from the exhaust gas. It is experimentally observed that such an exhaust gas whirling flow S is generated and that condensed water in an exhaust gas is centrifuged by the whirling flow S to flow along the inner wall of the exhaust passage.

As a result, there is substantially no condensed water near the axis of the exhaust port 4. According to this embodiment, the element 25 of the air-fuel ratio sensor 19 is positioned on the axis of the exhaust port 4. This allows the exhaust gas to contact the element 25 in an area where there is substantially no condensed water, thus preventing the element 25 from contacting condensed water. Therefore, the heater 29 can be energized to heat the element 25 quickly after starting up the internal combustion engine, while preventing the element 25 from contacting and hence being cracked by the condensed water even when such heating is performed. Consequently, it is possible to heat and activate the element 25 quicker than the conventional art, thus improving emission, specifically cold emission, after the start up of the internal combustion engine.

In addition, the outlet 11 of the bypass passage 9 opens into the exhaust port 4 in a direction tangent to the circumference of the exhaust port 4. With this construction, when the waste gate valve 12 is opened to enable exhaust bypassing, as indicated by the broken arrow in the drawing, the bypass flow B can merge with the whirling flow S in the same direction as each other. This does not disturb the whirling flow S, thus allowing centrifugal separation of condensed water to be performed favorably without interruption.

In addition, the inner end hole 27A and the outer end hole 27B are coaxially formed in the inner cover member 26A and the outer cover member 26B, respectively, of the air-fuel ratio sensor 19. With the construction, the exhaust gas in the exhaust passage can immediately reach and contact the element 25 in the cover 26, thus ensuring satisfactory sensor response as well as realizing high-precision air-fuel ratio feedback control. Moreover, the inner end hole 27A and the outer end hole 27B are disposed on the axis of the exhaust port 4. Therefore, the exhaust gas can be inducted from an area where there is no condensed water, thus preventing the element 25 from being wetted with water. The inner side holes 28A and the outer side holes 28B of the inner cover member 26A and the outer cover member 26B, respectively, also allow induction of the exhaust gas for improvement of the detection precision of the air-fuel ratio. These holes are not in alignment to prevent condensed water from reaching the element 25.

Although the element 25 of the air-fuel ratio sensor 19 is positioned on the axis of the exhaust port 4 of the turbine 2 in this embodiment, the element 25 may be positioned off the axis of the exhaust port 4, as long as intrusion of condensed water can be prevented. Likewise, the outer end hole 27B of the outer cover member 26B may be disposed off the axis of the exhaust port 4. The cover may not necessarily be made up of a plurality of cover members, and may be composed of a single cover member.

Figure 6:
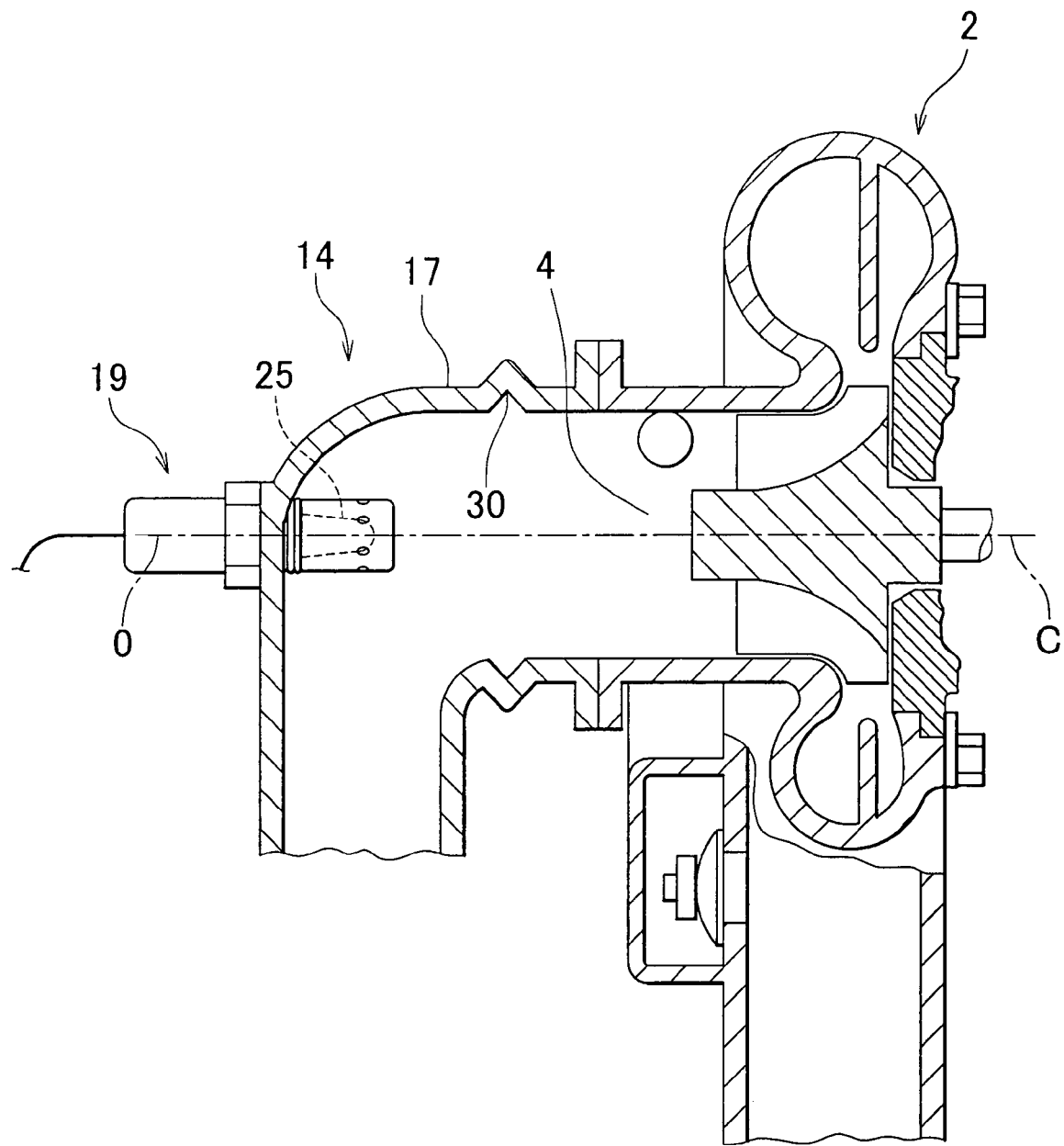
FIG. 6 is a vertical cross sectional view showing another embodiment of the present invention.

Now, another embodiment of the present invention will be described with reference to FIG. 6. The same components as in the above embodiment are given the same reference numerals and symbols, and will not be described again.

This embodiment is different from the above embodiment only in that a recess depressed radially outward is provided in at least a part of the exhaust passage from the exhaust port 4 to the air-fuel ratio sensor 19. In this embodiment, the recess is a circumferential groove 30 along the circumference of the exhaust passage. The circumferential groove 30 is provided in the straight portion 17 of the exhaust pipe 14 between the exhaust port 4 and the air-fuel ratio sensor 19, and extends perpendicularly to the axis of the straight portion 17 for an entire circumference. The cross section of the circumferential groove 30 may be of any shape, and is in the shape of the letter V in this embodiment. The outer surface of the exhaust pipe 14 at the back of the circumferential groove 30 is projected radially outward, correspondingly to the shape of the circumferential groove 30.

Besides the above functions and effects, the following functions and effects can be obtained with this embodiment. Condensed water centrifuged by the exhaust gas whirling flow S can be retained in the circumferential groove 30, thus preventing the condensed water from flowing downstream of the circumferential groove 30. This can more reliably prevent the element 25 of the air-fuel ratio sensor 19 from being wetted with water. After the exhaust gas and the exhaust pipe 14 are warmed enough, the condensed water retained in the circumferential groove 30 is vaporized by the heat from the exhaust gas and the exhaust pipe 14 and discharged downstream. Thus, the air-fuel ratio sensor 19 is prevented from being wetted with the condensed water retained in the circumferential groove 30.

Although only one circumferential groove 30 is provided in this embodiment, a plurality of circumferential grooves 30 may be provided.

Such a recess provided in the exhaust passage can prevent the air-fuel ratio sensor 19 from being wetted with water by retaining condensed water in the recess. The recess is not limited to the circumferential groove 30 such as described above, and may be one or more separate depressions, for example. Such depressions may be circular, rectangular, or of any shape. The recess may be provided at the exhaust port of the turbine. The groove may extend not for an entire circumference, and may extend only for a predetermined range of angles less than 360°.

Figure 7:
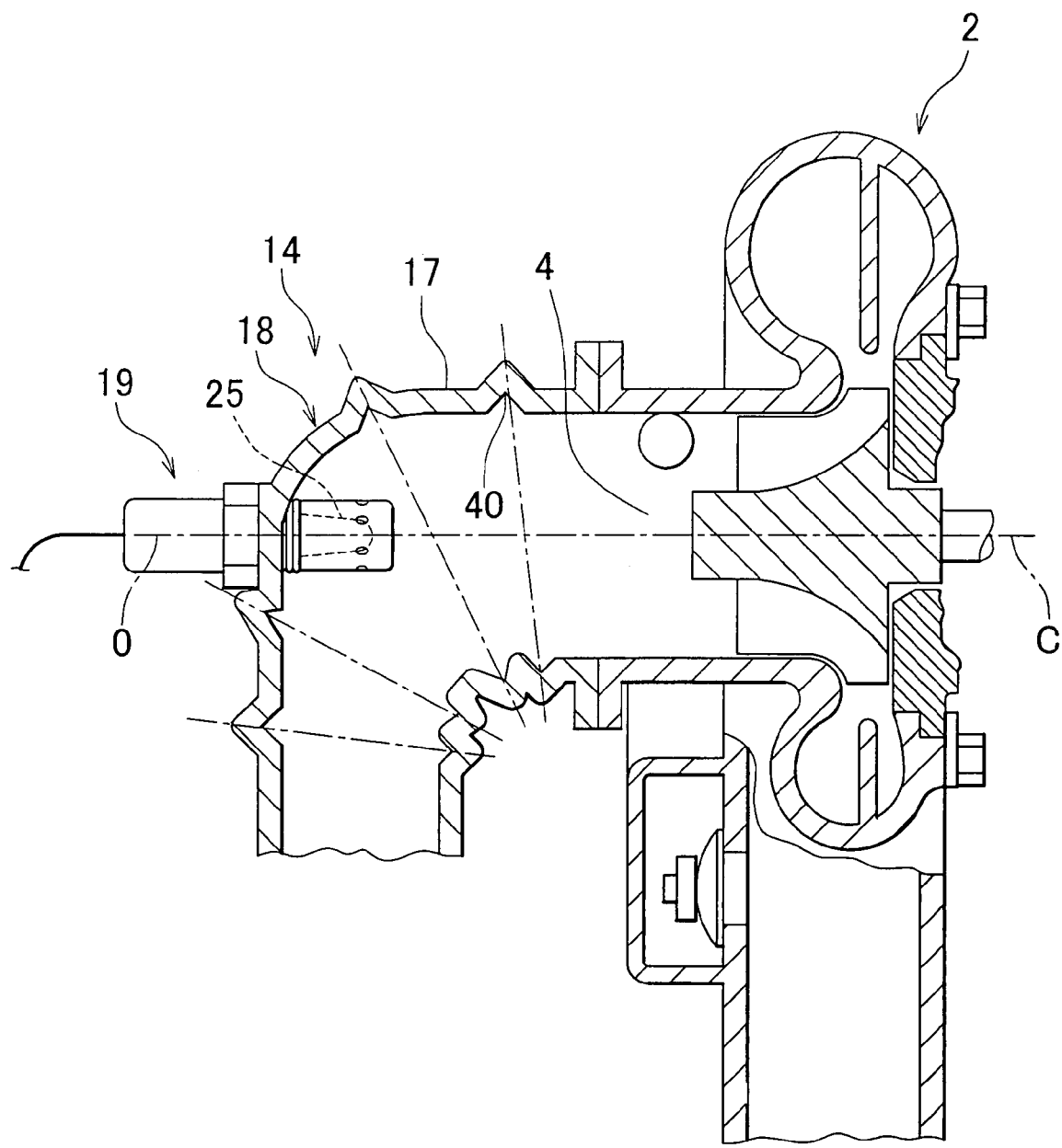
FIG. 7 is a vertical cross sectional view showing a modification example of a groove according to the another embodiment of the present invention.

FIG. 7 shows a modification of a groove as the recess. As shown, the groove in the drawing is a spiral groove 40 extending from a predetermined position between the exhaust port 4 and the air-fuel ratio sensor 19 to a predetermined position downstream of the air-fuel ratio sensor 19. The spiral groove 40 extends from substantially the upstream end of the straight portion 17 of the exhaust pipe 14 to substantially the downstream end of the bent portion 18 of the exhaust pipe 14. The cross section of the spiral groove 40 also may be of any shape, and also is in the shape of the letter V in this modification, as described above. The outer surface of the exhaust pipe 14 at the back of the spiral groove 40 is projected radially outward.

Besides the functions and effects described above, the following functions and effects can be obtained with this example. Condensed water centrifuged by the exhaust gas whirling flow S can be retained in the spiral groove 40, caused to flow along the spiral groove 40, and discharged downstream of the air-fuel ratio sensor 19. The retained condensed water can be discharged in the liquid form before the exhaust gas and the exhaust pipe 14 reach high temperatures enough to vaporize the condensed water. This can more reliably prevent the element 25 of the air-fuel ratio sensor 19 from being wetted with water.

Figure 8:
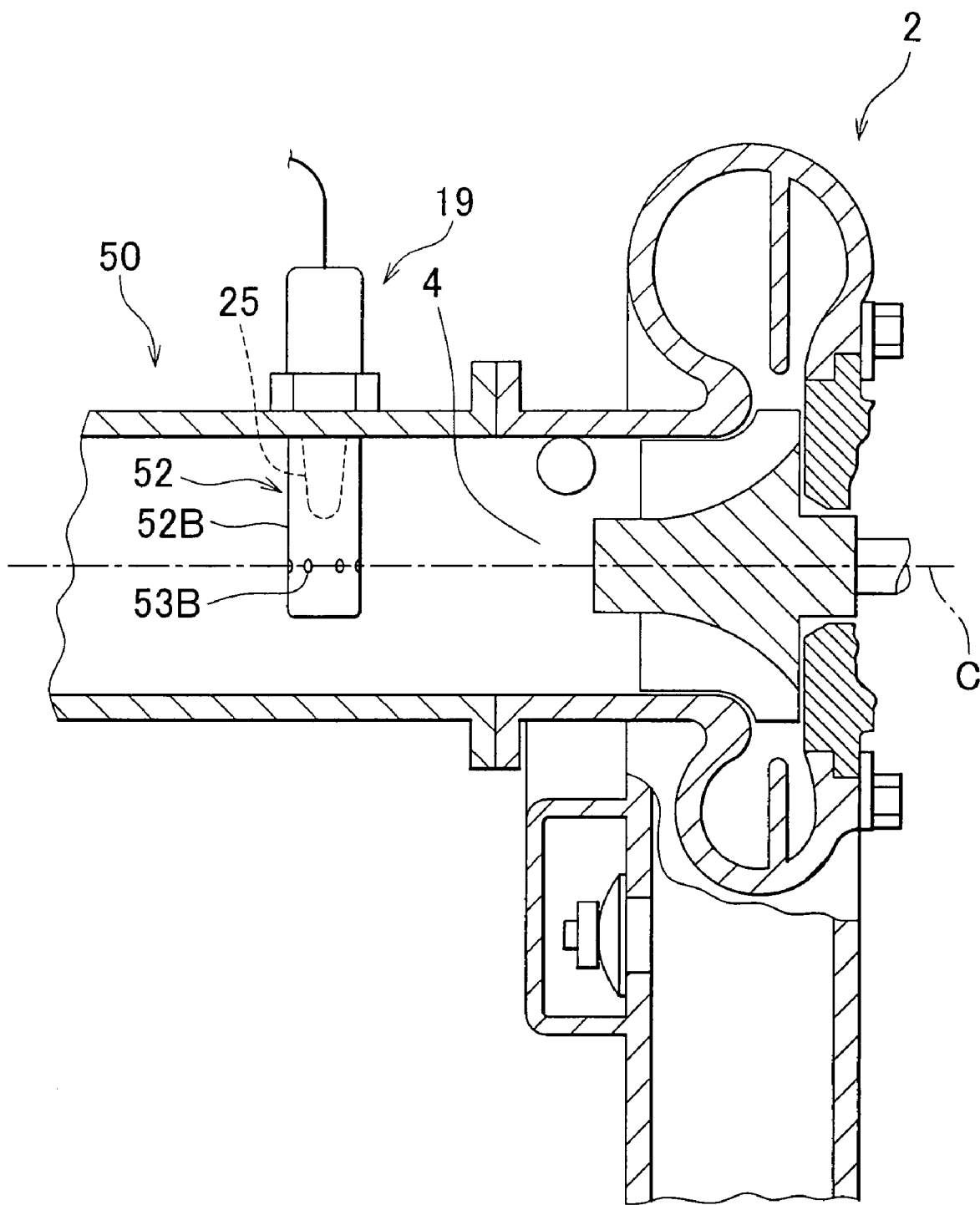
FIG. 8 is a vertical cross sectional view showing still another embodiment of the present invention.

Now, still another embodiment of the present invention will be described with reference to FIG. 8. The same components as in the above embodiment are given the same reference numerals and symbols, and will not be described again.

As shown in the drawing, this embodiment is different from the above embodiments in shape of the exhaust pipe 50 connected downstream of the turbine 2, and the exhaust pipe 50 is formed as a straight pipe without a bent portion. The exhaust pipe 50 is coaxially connected to the exhaust port 4 of the turbine 2. The air-fuel ratio sensor 19 is attached to the exhaust pipe 50 such that their axes are perpendicular to each other.

The air-fuel ratio sensor 19 has a cover 52 longer than the cover in the above embodiments. The cover 52 is made up of an inner cover member (not shown) and an outer cover member 52B, as in the above embodiments. At least the outer cover member 52B is longer than the outer cover member in the above embodiments, so as to reach the axis of the exhaust pipe 50. A plurality of outer side holes 53B are formed in the peripheral surface of the outer cover member 52B.

The outer side holes 53B are positioned on or near the axis of the exhaust pipe 50 (that is, the axis of the exhaust port 4 of the turbine 2). In this embodiment, all the outer side holes 53B are positioned at the height of the axis of the exhaust pipe 50, particularly the outer side hole 53B opening upstream toward the exhaust port 4 is positioned on the axis of the exhaust pipe 50. An outer end hole is also formed in the end surface of the outer cover member 52B, as in the above embodiments. The arrangement of holes of the inner cover member is the same as in the above embodiments.

Also in this embodiment, condensed water is centrifuged by the exhaust gas whirling flow S so that there is substantially no condensed water near the axis of the exhaust pipe 50, as in the above embodiments. In this embodiment, since the holes of the cover 52 of the air-fuel ratio sensor 19 (the outer side holes 53B) are positioned on the axis of the exhaust pipe 50, the exhaust gas can be inducted into the cover 52 to contact the element 52 in an area where there is no condensed water. This can prevent the element 25 from contacting condensed water. Other functions and effects are generally the same as those of the above embodiments.

The holes of the cover 52 opening into the exhaust passage, that is, the outer side holes 53B of the outer cover member 52B, may be positioned off the axis of the exhaust pipe 50, as long as intrusion of condensed water can be prevented. The holes of the cover 52 may be arranged otherwise. For example, the holes may be arranged in a plurality of (for example, two) rows different in axial position of the cover 52.

The recess in the above embodiments (groove 30 or spiral groove 40) may be provided to this embodiment.

Various embodiments of the present invention are possible. For example, in the embodiments shown in FIGS. 1, 6 and 7, the air-fuel ratio sensor 19 may be disposed with its axis inclined with respect to the axis of the exhaust port 4 of the turbine 2. That is, the air-fuel ratio sensor 19 may not necessarily be coaxial with the exhaust port 4. Likewise, in the embodiment shown in FIG. 8, the air-fuel ratio sensor 19 may be disposed with its axis inclined with respect to the direction perpendicular to the axis of the exhaust port 4 of the turbine 2. That is, the axis of the air-fuel ratio sensor 19 may not necessarily be perpendicular to the axis of the exhaust port 4. The holes of the cover for the air-fuel ratio sensor may be varied in terms of shape, number and arrangement.

According to the embodiments of the present invention, with a turbine of a turbocharger and an air-fuel ratio sensor disposed on an exhaust passage, it is possible to prevent the air-fuel ratio sensor from being wetted with condensed water in the exhaust passage, and a sensor element from being cracked.

Embodiments of the present invention are not limited to those described above, and include various modifications, applications and equivalents that fall within the scope of the present invention as defined by the appended claims. Thus, the present invention should not be interpreted restrictively, and may be applied to any other technology that falls within the scope of the present invention.

What is claimed is:

1. An internal combustion engine comprising:
a turbocharger having a turbine disposed on an exhaust passage;
an air-fuel ratio sensor including an element for contacting an exhaust gas, the air-fuel ratio sensor being disposed downstream of and in proximity to the turbine with the element positioned on or near an axis of an exhaust port of the turbine; and
a bypass passage for allowing the exhaust gas to bypass a turbine wheel of the turbine, wherein:
an outlet of the bypass passage opens into a part of the exhaust passage between the exhaust port and the air-fuel ratio sensor in a direction tangent to the circumference of the exhaust passage,
a part of the exhaust passage between the exhaust port and the air-fuel ratio sensor is formed with a recess depressed outward in a radial direction of the exhaust passage,
the recess is a groove along the circumference of the exhaust passage, and
the groove is a spiral groove extending from a predetermined position between the exhaust port and the air-fuel ratio sensor to a predetermined position downstream of the air-fuel ratio sensor.

2. The internal combustion engine according to claim 1, wherein a part of a side surface of the bypass passage is connected to the exhaust passage along the direction tangent to the circumference of the exhaust passage.

3. The internal combustion engine according to claim 1, wherein a bent portion is formed on a part of the exhaust passage downstream of the exhaust port, and the air-fuel ratio sensor is disposed at the bent portion so as to be coaxial with the exhaust port.

4. The internal combustion engine according to claim 3, wherein the bent portion is bent by an angle of 90°.

5. An internal combustion engine comprising:
a turbocharger having a turbine disposed on an exhaust passage;
an air-fuel ratio sensor including an element for contacting an exhaust gas and a cover for covering the element, the cover having a hole for introducing the exhaust gas in the exhaust passage to the element, the air-fuel ratio sensor being disposed downstream of and in proximity to the turbine with the hole positioned on or near an axis of an exhaust port of the turbine; and
a bypass passage for allowing the exhaust gas to bypass a turbine wheel of the turbine, wherein:
an outlet of the bypass passage opens into a part of the exhaust passage between the exhaust port and the air-fuel ratio sensor in a direction tangent to the circumference of the exhaust passage,
a part of the exhaust passage between the exhaust port and the air-fuel ratio sensor is formed with a recess depressed outward in a radial direction of the exhaust passage,
the recess is a groove along the circumference of the exhaust passage, and
the groove is a spiral groove extending from a predetermined position between the exhaust port and the air-fuel ratio sensor to a predetermined position downstream of the air-fuel ratio sensor.

6. The internal combustion engine according to claim 5, wherein a part of a side surface of the bypass passage is connected to the exhaust passage along the direction tangent to the circumference of the exhaust passage.

7. The internal combustion engine according to claim 5, wherein a bent portion is formed on a part of the exhaust passage downstream of the exhaust port, and the air-fuel ratio sensor is disposed at the bent portion so as to be coaxial with the exhaust port.

8. The internal combustion engine according to claim 7, wherein the bent portion is bent by an angle of 90°.

* * * * *